United States Patent [19]

Moosbrugger et al.

[11] Patent Number: 4,697,365

[45] Date of Patent: Oct. 6, 1987

[54] EDGE-ILLUMINATED SIGN

[75] Inventors: Dennis S. Moosbrugger, Ypsilanti; Joseph DiFazio, Troy; David N. Watson, Livonia, all of Mich.

[73] Assignee: Xebron Corporation, Ann Arbor, Mich.

[21] Appl. No.: 779,905

[22] Filed: Sep. 25, 1985

[51] Int. Cl.[4] ............................................. G09F 13/18
[52] U.S. Cl. ................................................... 40/546
[58] Field of Search .................. 40/546, 549, 570, 572

[56] References Cited

U.S. PATENT DOCUMENTS

| | | | |
|---|---|---|---|
| 1,707,965 | 4/1929 | Scantlebury | 40/546 |
| 1,931,742 | 10/1933 | Scharringhausen | 40/130 |
| 2,548,126 | 4/1951 | Sholkin | 40/546 |
| 2,564,110 | 8/1951 | Howenstine et al. | 40/546 |
| 2,566,458 | 9/1951 | Macau | 40/546 |
| 2,611,981 | 9/1952 | Whitebread | 40/130 |
| 3,591,941 | 7/1971 | Jaffe, Jr. | 40/546 |
| 4,255,873 | 3/1981 | Eberle | 434/82 |

FOREIGN PATENT DOCUMENTS

| | | | |
|---|---|---|---|
| 690832 | 7/1964 | Canada | 40/546 |
| 2030750 | 4/1980 | United Kingdom | 40/546 |

Primary Examiner—Robert P. Swiatek
Assistant Examiner—Cary E. Stone
Attorney, Agent, or Firm—Foley & Lardner

[57] ABSTRACT

An improved edge-illuminated sign includes a transparent plate, a hollow housing secured to one or more edges of the transparent plate, and a light source disposed within the housing for illuminating an edge of the transparent plate. The housing can take the form of a frame surrounding the transparent plate on four sides, allowing operative elements of a light unit to be disposed inside of one or more hollow frame sections. According to a further aspect of the invention, the light source housing includes a pair of elongated members releasably fastened together. The edge-illuminated sign of the invention is simple to construct, light in weight, compact, and has an attractive appearance.

15 Claims, 8 Drawing Figures

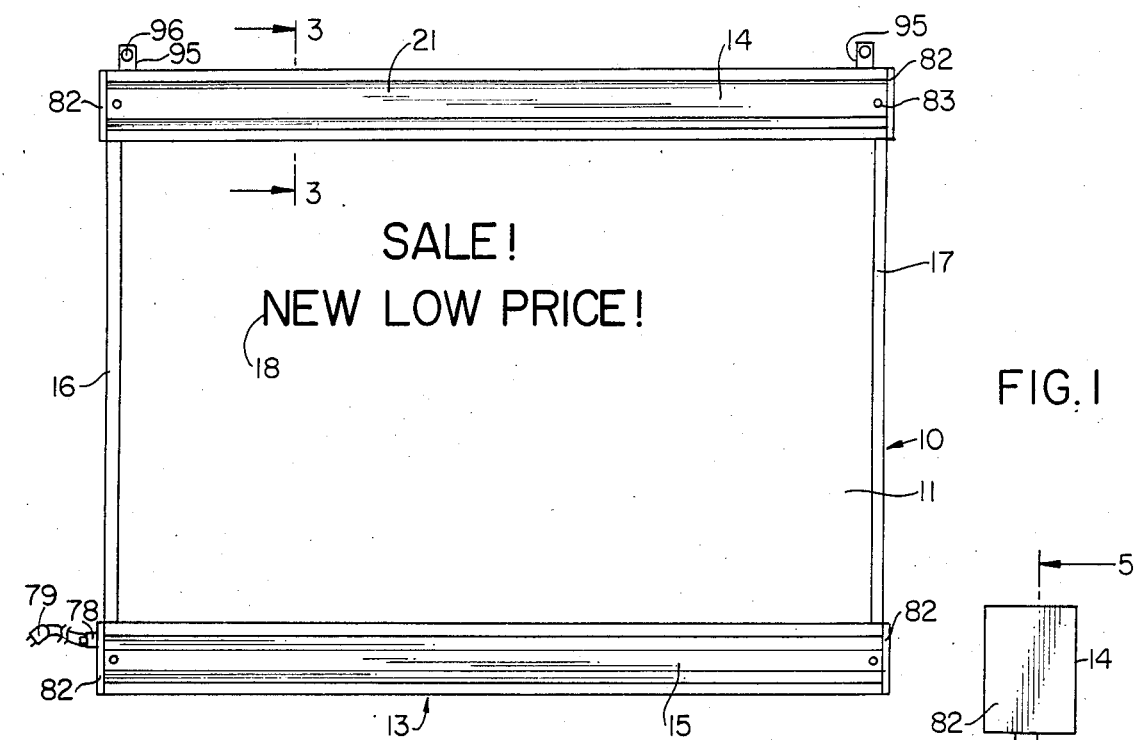
FIG. 1
FIG. 2
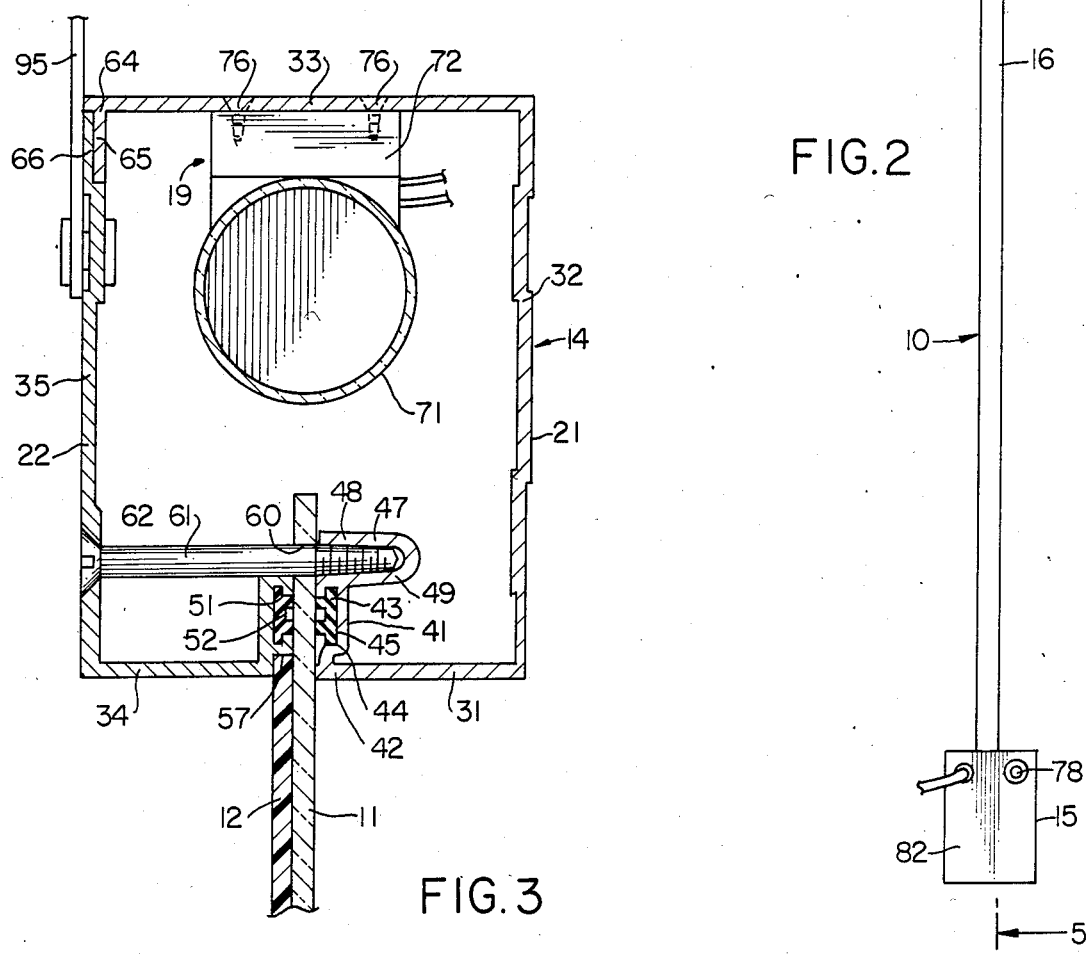
FIG. 3

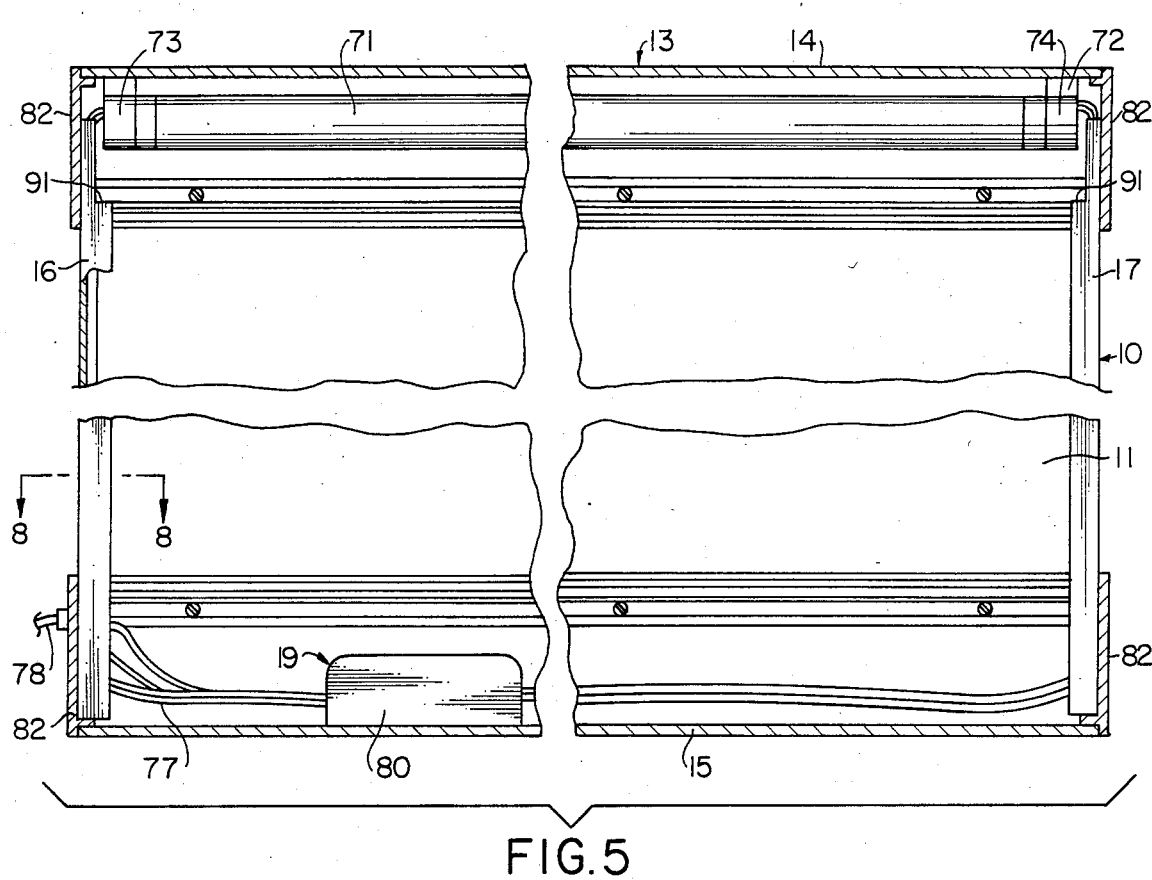
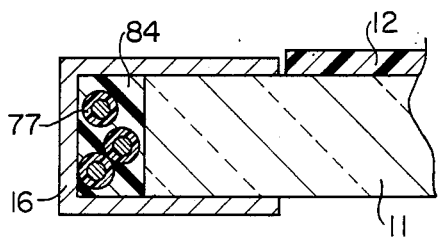
FIG.5
FIG.8

EDGE-ILLUMINATED SIGN

FIELD OF THE INVENTION

This invention relates to an improved, edge-illuminated sign having a unique structure which is simple to assemble, lightweight, and attractive.

BACKGROUND OF THE INVENTION

Edge lighted signs, information boards and writing tablets are generally known. Such devices generally comprise a transparent plate, such as a pane of glass, mounted upright upon a base. The base houses a light source, such a fluorscent lightbulb. The transparent plate is mounted to allow light to enter the plate through its lower edge, which lower edge is in close proximity to the lightbulb. A message or design is inscribed in or written on the transparent plate. Light which has entered the transparent plate is reflected within the crystal structure of the plate and eventually leaves the plate in different directions, thereby illuminating the writing or design born by the plate. Examples of such edge lighted signs are described in U.S. Pat. No. 1,707,965, issued to Scantlebury on Apr. 2, 1929, U.S. Pat. No. 1,931,742, issued to Scharringhausen on Oct. 24, 1933, U.S. Pat. No. 2,564,110, issued to Howenstine on Aug. 14, 1952, U.S. Pat. No. 2,566,458, issued to Macau on Sept. 4, 1951, U.S. Pat. No. 2,611,981, issued to Whitebread on Sept. 30, 1952, and U.S. Pat. No. 4,255,873, issued to Eberle on Mar. 17, 1981.

These prior art edge-lighted signs are generally useful, but are not particularly simple in structure, economical, light in weight, or easy to assemble.

SUMMARY OF THE INVENTION

The present invention provides an edge-illuminated sign of simplified structure suitable for a variety of uses, including as a sign, bulletin board, or artists' tablet for optical art. According to one aspect of the invention, an edge portion of a transparent plate fits into an opening in a hollow housing and is secured therein between a pair of elongated, thin-walled panel members, which members fit together to define the housing. These members are typically made of aluminum, thereby minimizing the weight of the housing and allowing the size of the transparent plate to be increased without unduly increasing the weight of the sign as a whole. A bracket extends into the interior of the hollow housing from one member, and a fastener is used to simultaneously secure the second member to the first member by means of the bracket and secure the transparent plate in the opening defined between the two members. A light source disposed within the hollow interior of the housing illuminates the edge of the transparent plate which has been secured in the opening in the housing. By this means, light shines throughout the transparent plate and illuminates any writing or design appearing thereon.

According to another aspect of the invention, a pair of substantially identical, hollow frame sections (housings) secure opposite edge portions of the transparent plate, together effectively framing the sign. Either or both of these frame sections may house a light source for edge illumination. Optionally, a pair of splines may be mounted along the other two opposite edges of the transparent plate, spanning the frame sections, effectively defining a complete frame for the sign.

BRIEF DESCRIPTION OF THE DRAWING

A preferred exemplary embodiment will hereinafter be described in conjunction with the appended drawing, wherein like designations denote like elements, and:

FIG. 1 is a front view of an edge-illuminated sign according to the invention;

FIG. 2 is an end view of the edge-illuminated sign shown in FIG. 1;

FIG. 3 is a partial sectional view along the line 3—3 in FIG. 1;

FIG. 5 is a partial, partly broken-away, cross-sectional view of the edge-illuminated sign taken along the line 5—5 in FIG. 2;

FIG. 8 is a partial sectional view taken along the line 8—8 in FIG. 5.

Figure 4:
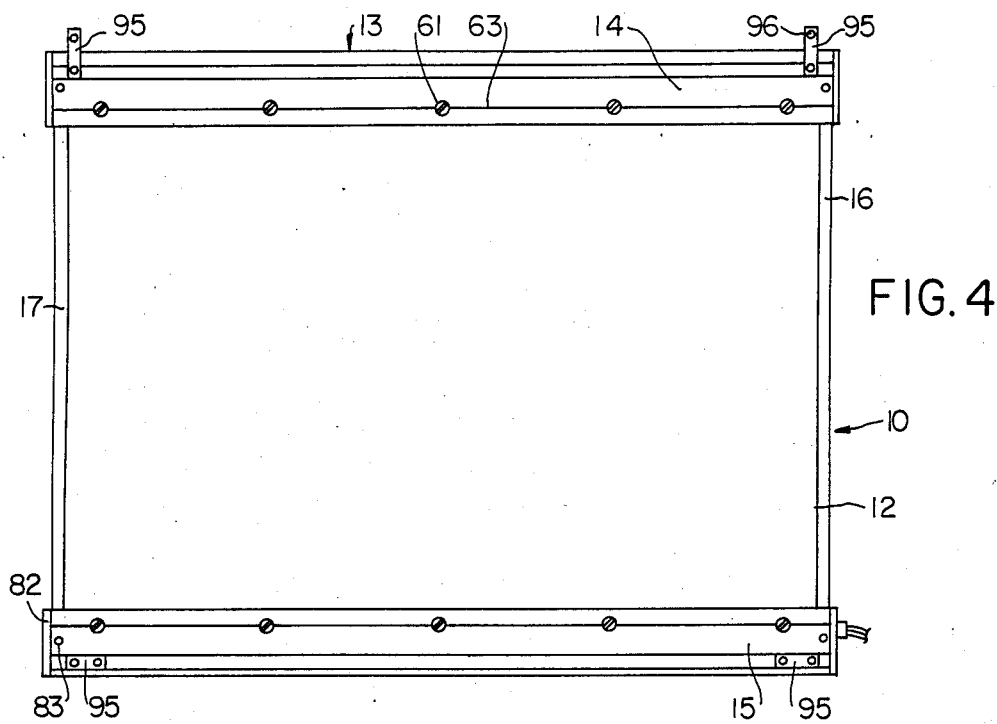
FIG. 4 is a rear view of the edge-illuminated sign shown in FIG. 1.

The term "sign" as referred to herein refers to any type of display of art or information, and also refers to a sign board which is blank, that is, before any design or writing has been drawn on the board.

DETAILED DESCRIPTION OF A PREFERRED EXEMPLARY EMBODIMENT

Referring now to FIGS. 1 through 4, one embodiment of an edge-illuminated sign 10, according to the invention, includes a substantially transparent plate 11 and an opaque backing plate or sheet 12 secured face-to-face within a hollow frame 13 which comprises upper and lower hollow frame sections 14, 15 connected by splines 16, 17. Indicia 18 appear on the front surface of transparent plate 11. Frame 13 houses a fluorescent light unit 19 which provides edge illumination for the sign.

Transparent plate 11, according to the invention, may be made of any transparent material, but is preferably made of glass or plastic, particularly Plexiglas (trademark of Rohm & Hass Co.) or Lucite (trademark of Du Pont De Nemours & Co.). Transparent plate 11 can very greatly in thickness, and is typically, for example, about one-third inch thick or less. Backing plate 12 is typically made of opaque black plastic such as PVC plastic, and is generally about one-eighth inch thick or less.

FIG. 2 shows in detail means for securing plates 11, 12 to upper frame section 14. Upper frame section 14 is substantially rectangular in cross-section and comprises a pair of elongated, front and rear frame members 21 and 22, respectively. Frame members 21, 22 preferable comprise aluminum extrusions having a thickness in the range of 0.005 to 0.01 inch and a length of from one to several feet, as desired. Members 21, 22 have uniform but different cross-sectional shapes. Front frame member 21 defines a partial bottom wall 31, a front wall 32 and a top wall 33 of upper frame section 14. Walls 31–33 are disposed at right angles to each other so that frame member 21 is substantially U-shaped in cross-section, bottom wall 31 being only about half the width of top wall 33. Rear frame member 22 defines a partial bottom wall 34 and a rear wall 35 of upper frame section 14. Walls 34, 35 are disposed at a right angle to each other, and rear frame member 22 is accordingly substantially L-shaped in cross-section.

Bottom walls 31, 34 together define the lower periphery of upper frame section 14. A front bracket 41 extends upwardly into the hollow interior of frame section 14 from the end of bottom wall 31 remote from front wall 32. A lower portion 42 of bracket 41 is C-shaped in cross-section, opening rearwardly, for retaining a pair of upper and lower enlarged edge portions 43, 44, respectively, of a front elastomeric seal strip 45. Front strip 45 resiliently engages the front face of transparent plate 11 near its upper end. An upper portion 47 of bracket 41 is substantially U-shaped in cross-section. However, upper and lower walls (legs) 48, 49, respectively, of U-shaped portion 47 diverge slightly as they open rearwardly for the purpose of engaging fastener screws, as described further below.

A rear bracket 51 extends upwardly from the end of bottom wall 34 remote from rear wall 35. Rear bracket 51 is C-shaped in cross-section and substantially matches front bracket 41, except that rear bracket 51 lacks structure corresponding to upper U-shaped portion 47. Brackets 41, 51 are conveniently formed as part of the aluminum extrusions referred to above so that brackets 41, 51 are integral with front and rear frame sections 21, 22. Rear bracket 51 faces frontwardly so as to oppose front bracket 41. Rear bracket 51 retains a rear elastomeric seal strip 52 in the same manner as described above for front strip 45, so that strips 45, 52 oppose each other. Rear strip 52 resiliently engages the rear face of transparent plate 11. Strips 45, 52 prevent oil and dirt from leaking out of the interior of upper frame section 14 onto plates 11, 12.

Bottom walls 31, 34 further include means for mounting and securing plates 11, 12 to upper frame section 14. A series of screws 61, such as sheet metal screws or self-tapping screws, are inserted through holes 62 in rear wall 35 and then through holes 60 in transparent plate 11 so that screws 61 bite into the walls 48, 49 of the channel defined by U-shaped portion 49. This locks frame members 21, 22 together and secures upper frame section 14 to transparent plate 11. Bottom wall 34 has a step 57 adjoining the opening admitting plate 11 into upper frame section 14, which step 57 is L-shaped so that an upper edge portion of backing plate 12 can abut against step 57, as shown in FIG. 3.

Figure 6:
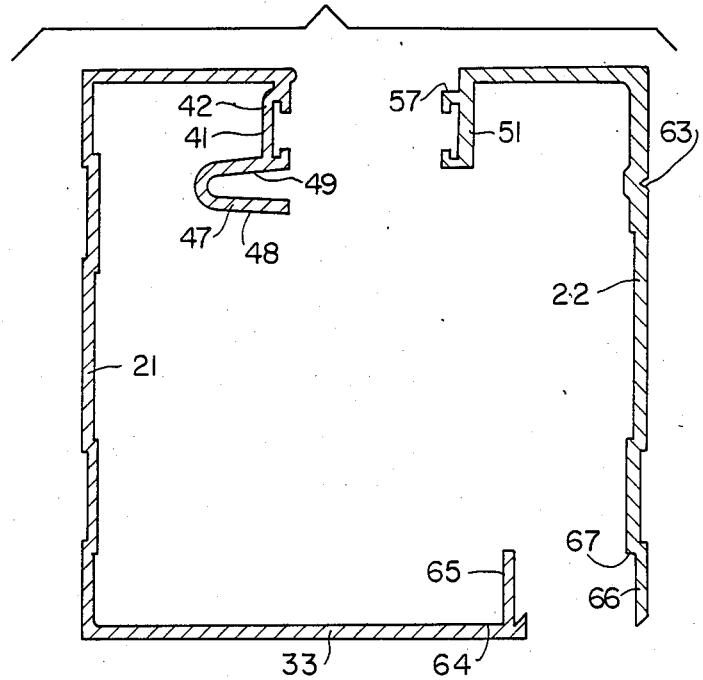
FIG. 6 is an exploded sectional view of the frame members shown in FIG. 3.

As best seen in FIGS. 4 and 6, rear wall 35 of rear frame member 22 has a shallow linear notch 63 which extends the entire length of frame member 22. Notch 63 facilitates assembly of the edge-illuminated sign, since holes 62 can be readily drilled at regular intervals along notch 63, and each hole 62 is thereby centered on notch 63 in the proper position for allowing screws 61 to engage U-shaped portion 49 of bracket 41.

As indicated in FIG. 3, front and rear frame members 21, 22 overlap near the upper rear edge of upper frame section 14 to impart greater stability to the assembled upper frame section 14. A rear end portion 64 of top wall 33 includes a short, downwardly extending wall 65 near its rearward edge. An upper end portion 66 of rear wall 35 includes an inner step 67 so that upper end portion 66 of wall 35 mates with rear end portion 64 of wall 33 when frame members 21, 22 are fitted together, as shown in FIG. 3. If desired, screws or other fasteners can be inserted through walls 35, 65 to further secure end portions 64, 66 together.

FIGS. 3 and 5 illustrate a fluorescent light unit 71 which illuminates transparent plate 11 by directly casting light on the upper edge of transparent plate 11. A standard fluorescent bulb 71 is mounted in a conventional fluorescent light fixture 72 between a pair of sockets 73, 74. Bulb 71 extends nearly the entire length of upper frame section 14. Fixture 72 is secured to top wall 33 of upper frame section 14 by any suitable means such as screws 76. Wires 77 connect fixture 72 to on-off switch 78, plug 79, and ballast 80 as described below so that light unit 16 can be plugged into an ordinary 110 volt outlet and turned on or off by the switch 78.

Lower hollow frame section 15 is substantially identical to upper frame section 14, except that it is used mainly to house ballast 80 for light unit 16. Wires 77 functionally connect ballast 80 to bulb 71, fixture 72, sockets 73, 74, switch 78 and plug 79. Wires 77 run through an inner groove of both of splines 16, 17 as shown in FIG. 5. Splines 16, 17 are U-shaped in cross-section as shown in FIG. 8.

Figure 7:
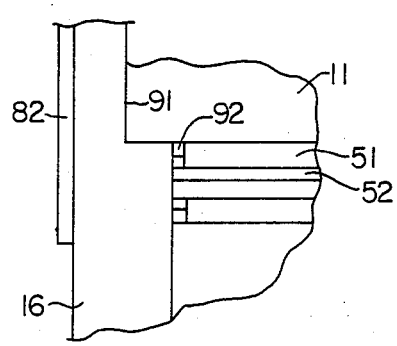
FIG. 7 is a partial view of the upper left corner of the edge-illuminated sign shown in FIG. 1, with the covering wall of the frame removed.

Splines 16, 17 are held in position by four end caps 82 secured by screws 83. As shown in FIG. 8, wires 77 are preferably packed in a layer of resin or cement 84. Splines 16, 17 cover opposite side edge portions of transparent plate 11. Backing plate 12 is conveniently less wide than plate 11 so that it can be removed without removing splines 16, 17 and end caps 82. As best shown in FIGS. 5 and 7, splines 16, 17 have L-shaped cut-away portions 91 at upper end portions thereof to allow splines 16, 17 to extend upwardly next to sockets 72, 73. Similarly, the C-shaped portions of brackets 41, 51 are cut away at opposite ends of brackets 41, 51 to define openings 92 for admitting splines 16, 17 as shown in FIG. 7.

Hollow frame sections 14, 15 are virtually identical, on the outside, giving sign 10 a neat, picture frame-like appearance as shown in FIG. 1. Frame sections 14, 15 are typically between 2 and 3 inches wide and deep, and several feet long. Pairs of hangers 95 having mounting holes 96 are rotably mounted near opposite ends of both of frame sections 14, 15 as shown in FIG. 4. Hangers 95 allow sign 10 to be mounted on a wall in a variety of positions. Since components of light unit 16 are housed in both of sections 14, 15, sign 10 is well-balanced and sections 14, 15 can be made smaller as compared to a sign wherein light unit 16 is built in only one frame section. Of course, if desired, the entirety of light unit 16 may be housed within a single frame section, leaving the other frame section empty, or allowing the other frame section and splines to be removed entirely. The single frame section in the latter alternative embodiment would serve simply as a housing for the light unit, and if desired, as a base for supporting the sign.

The edge-illuminated sign, according to the invention, operates as follows. The user writes, for example, a message on the surface of transparent plate 11 with a crayon or similar waxy pigment, then plugs in the sign and turns on the light by means of switch 78. Light from bulb 71 enters transparent plate 11 through its upper edge. A portion of this light eventually reflects out of transparent plate 11 through its front face. The message on the surface of the plate comprises a thin layer of the waxy pigment, and is thus substantially translucent. Light passing through this waxy pigment makes the message seem to glow to anyone observing it. Certain pigments having fluorescent qualities, such as artist's crayons made by Caran d'Ache of Switzerland, are particularly suitable for writing on the transparent plate. To erase the message, the user wipes the surface of transparent plate 11 with a cloth, preferably using suitable cleaning fluid.

It will be understood that the above description is of a preferred exemplary embodiment of the present invention and that the invention is not limited to the specific forms shown. Modifications may be made in the design and arrangement of the elements without departing from the spirit of the invention as expressed in the appended claims.

What is claimed is:

1. An edge-illuminated sign comprising:
   a transparent plate;
   a hollow housing including a pair of first and second elongated members which fit together to define an opening into which an edge portion of said plate is inserted, and a bracket which extends into the hollow interior of said housing from said first member;
   means for releasably fastening said second member to said bracket and securing said transparent plate between said first and second members in said opening; and
   means disposed within said housing for illuminating the edge of said transparent plate inserted into said opening.

2. The edge-illuminated sign of claim 1, wherein said bracket has means defining a substantially U-shaped channel having diverging walls, and said fastening means comprises a screw inserted through said second member, said screw having threads which bite into said diverging walls of said U-shaped channel to secure said second member to said first member.

3. The edge-illuminated sign of claim 2, wherein said second member has means defining an elongated linear notch along the length of the exterior thereof, and further has means defining a plurality of spaced apart holes centered upon said notch, said screws being inserted through said holes.

4. The edge-illuminated sign of claim 1, further comprising means for preventing oil and dirt within said hollow housing from leaking out of said opening onto the surface of said transparent plate.

5. The edge-illuminated sign of claim 4, wherein said means for preventing dirt and oil from leaking onto the surface of said transparent plate comprises:
   said bracket has a first portion of C-shaped cross-section which extends into said hollow interior of said housing, and said second member also has a bracket which extends into said hollow interior of said housing, said bracket of said second member having a second portion of C-shaped cross-section which opposes said first C-shaped portion, said C-shaped portions of said brackets retaining a pair of opposing seal strips which engage opposite surfaces of said transparent plate within said opening.

6. The edge-illuminated sign of claim 1, wherein said first and second members comprise metal extrusions having substantially uniform, but different, cross-sectional shapes.

7. The edge-illuminated sign of claim 6, wherein said first member is substantially U-shaped in cross-section and said second member is substantially L-shaped in cross-section.

8. The edge-illuminated sign of claim 1, further comprising an opaque backing plate disposed in face-to-face contact with said transparent plate, said opaque backing being inserted into said opening in said hollow housing.

9. An edge-illuminated sign, comprising:
   a transparent plate;
   an opaque backing plate disposed in face-to-face contact with said transparent plate;
   a frame including a pair of elongated, hollow frame sections each having an opening therein for releasably engaging said transparent plate, having opposite top and bottom edge portions of said plates being inserted into each of said openings;
   means for releasably fastening respective opposite edge portions of said transparent plate in said openings; and
   means disposed within at least one of said hollow frames for illuminating an edge of said transparent plate.

10. The edge-illuminated sign of claim 9, wherein said means for illuminating said transparent plate comprises a fluorescent light unit disposed within said frame sections.

11. The edge-illuminated sign of claim 10, wherein said frame further comprises a pair of splines mounted on opposite side edge portions of said plates and spanning said hollow frame sections.

12. The edge-illuminated sign of claim 11, wherein said light unit comprises a fluoroscent bulb and a light fixture disposed inside of one of said hollow frame sections and a ballast disposed inside the other of said hollow frame sections.

13. The edge-illuminated sign of claim 12, wherein said light unit further comprises wires for functionally connecting said bulb, said light fixture and said ballast, said wires extending along and within said splines.

14. The edge-illuminated sign of claim 9, wherein said frame sections each comprise a pair of elongated frame members each of substantially uniform cross-section which fit together and define each of said openings into which said plates are inserted, and a plurality of end caps inserted into open opposite end of said frame sections.

15. The edge-illuminated sign of claim 9, further comprising a hanger having a mounting hole therein rotably secured to said frame.

* * * * *